US009081912B2

(12) United States Patent
Liao et al.

(10) Patent No.: US 9,081,912 B2
(45) Date of Patent: Jul. 14, 2015

(54) METHOD AND APPARATUS FOR NODE HOT-SWAPPING

(71) Applicant: Huawei Technologies Co., Ltd., Shenzhen (CN)

(72) Inventors: Yixiang Liao, Hangzhou (CN); Dengben Wu, Hangzhou (CN); Yu Zhang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 351 days.

(21) Appl. No.: 13/683,861

(22) Filed: Nov. 21, 2012

(65) Prior Publication Data

US 2013/0138856 A1 May 30, 2013

Related U.S. Application Data

(63) Continuation of application No. PCT/CN2012/078113, filed on Jul. 3, 2012.

(30) Foreign Application Priority Data

Nov. 24, 2011 (CN) .......................... 2011 1 0378843

(51) Int. Cl.
*G06F 13/40* (2006.01)
*H04L 12/24* (2006.01)
*G06F 13/00* (2006.01)

(52) U.S. Cl.
CPC ............ *G06F 13/4081* (2013.01); *G06F 13/00* (2013.01); *G06F 13/409* (2013.01); *H04L 41/0809* (2013.01)

(58) Field of Classification Search
CPC .............. G06F 13/4081; G06F 13/409; H04L 41/0809

USPC ................................................... 710/300–302
See application file for complete search history.

(56) References Cited

U.S. PATENT DOCUMENTS 6,058,445 A    5/2000  Chari et al.
6,134,614 A   10/2000  Chari et al.
(Continued)

FOREIGN PATENT DOCUMENTS

CN    1553318 A    12/2004
CN    1633131 A     6/2005
(Continued)

OTHER PUBLICATIONS

Office Action issued in corresponding Chinese Patent Application No. 201110378843.1, mailed Feb. 7, 2013.
(Continued)

*Primary Examiner* — Ryan Stiglic
(74) *Attorney, Agent, or Firm* — Brinks Gilson & Lione

(57) ABSTRACT

The present invention discloses a method and an apparatus for node hot-swapping, which simplify the node hot-adding procedure, and improve the operation efficiency of the hot-adding procedure. The present invention includes: obtaining, by a server from a baseboard management controller BMC of a node device to be added, static hardware information of the node device to be added, and storing it into a storage device of the server, where the static hardware information is obtained through an out-band channel by the BMC of the node device to be added; receiving, by the server, a node hot-adding command sent by a user, where the hot-adding command carries identifier information of the node device to be added; obtaining the static hardware information of the node device to be added corresponding to the identifier information from the storage device; and adding, according to the static hardware information, the node device to be added.

12 Claims, 4 Drawing Sheets

(56) References Cited

U.S. PATENT DOCUMENTS

| | | | | |
|---|---|---|---|---|
| 6,968,414 | B2* | 11/2005 | Abbondanzio et al. | 710/301 |
| 7,350,115 | B2* | 3/2008 | Mathew et al. | 714/46 |
| 7,353,415 | B2* | 4/2008 | Zaretsky et al. | 713/320 |
| 7,836,238 | B2* | 11/2010 | Freimuth et al. | 710/302 |
| 8,484,493 | B2 | 7/2013 | Lambert et al. | 713/320 |
| 2003/0105904 | A1* | 6/2003 | Abbondanzio et al. | 710/302 |
| 2005/0138473 | A1* | 6/2005 | Mathew et al. | 714/27 |
| 2006/0140211 | A1* | 6/2006 | Huang et al. | 370/466 |
| 2007/0233833 | A1* | 10/2007 | Wang | 709/223 |
| 2008/0086580 | A1* | 4/2008 | Zhang et al. | 710/107 |
| 2008/0147937 | A1* | 6/2008 | Freimuth et al. | 710/104 |
| 2008/0313476 | A1* | 12/2008 | Hansen | 713/300 |
| 2010/0024001 | A1* | 1/2010 | Campbell et al. | 726/2 |
| 2012/0331538 | A1 | 12/2012 | Yuan et al. | |

FOREIGN PATENT DOCUMENTS

| | | | |
|---|---|---|---|
| CN | 1641610 | A | 7/2005 |
| CN | 1728662 | A | 2/2006 |
| CN | 1924784 | A | 3/2007 |
| CN | 101043359 | A | 9/2007 |
| CN | 102043868 | A | 5/2011 |
| CN | 102147739 | A | 8/2011 |
| CN | 102195930 | A | 9/2011 |
| CN | 102520982 | A | 6/2012 |

OTHER PUBLICATIONS

Search Report issued in corresponding Chinese Patent Application No. 201110378843.1, dated Dec. 20, 2012, 6 pages.

Office Action issued in corresponding Chinese Patent Application No. 201110378843.1, mailed May 15, 2013, 8 pages.

International Search Report issued in corresponding PCT Patent Application No. PCT/CN2012/078113, mailed Oct. 18, 2012.

* cited by examiner

METHOD AND APPARATUS FOR NODE HOT-SWAPPING

CROSS-REFERENCE TO RELATED APPLICATIONS

This application is a continuation of International Application No. PCT/CN2012/078113, filed on Jul. 3, 2012, which claims priority to Chinese Patent Application No. 201110378843.1, filed on Nov. 24, 2011, both of which are hereby incorporated by reference in their entireties.

FIELD OF THE INVENTION

The present invention relates to the field of hot-swapping technologies, and in particular, to a method and an apparatus for node hot-swapping.

BACKGROUND OF THE INVENTION

At present, to improve quality of service, a high-end server usually supports dynamic configuration of a system device. A node hot-swapping operation is required when the dynamic configuration of the system device is implemented. The node hot-swapping operation is controlled by platform management software in a server, and includes a node hot-adding operation and a node hot-removing operation. The node hot-adding operation method includes the following: A node device is powered on; the BIOS (Basic Input Output System, basic input output system) of the node device obtains basic hardware information of the node device through a self test, and reports the basic hardware information to the platform management software; and the platform management software completes the hot-adding operation of the node according to the basic hardware information.

During the implementation of the preceding node hot-adding operation, the inventor finds that the prior art has at least the following problems: The BIOS can obtain the basic hardware information of the node device only after performing a self test after the node device is powered on; in addition, before the platform management software completes the node hot-adding operation according to the basic hardware information, the BIOS needs to perform a cold reset operation and enables the node device to restart in the hot-adding mode. Therefore, the node hot-adding procedure is complex, and the operation efficiency of the hot-adding procedure is decreased.

SUMMARY OF THE INVENTION

Embodiments of the present invention provide a method and an apparatus for node hot-swapping, which simplify the node hot-adding procedure and improve the operation efficiency of the hot-adding procedure.

In order to achieve the foregoing objective, the embodiments of the present invention adopt the following technical solutions.

A method for node hot-swapping includes:

obtaining, by a server from a baseboard management controller BMC of a node device to be added, static hardware information of the node device to be added, and storing the static hardware information into a storage device of the server, where the static hardware information is obtained through an out-band channel by the BMC of the node device to be added;

receiving, by the server, a node hot-adding command sent by a user, where the hot-adding command carries identifier information of the node device to be added;

obtaining the static hardware information of the node device to be added corresponding to the identifier information from the storage device; and adding, according to the static hardware information, the node device to be added.

An apparatus for node hot-swapping includes:

a first obtaining unit, configured for a server to obtain from a baseboard management controller BMC of a node device to be added, static hardware information of the node device to be added, and store the static hardware information into a storage device of the server, where the static hardware information is obtained through an out-band channel by the BMC of the node device to be added;

a receiving unit, configured to receive a node hot-adding command sent by a user, where the hot-adding command carries identifier information of the node device to be added;

a second obtaining unit, configured to obtain the static hardware information of the node device to be added corresponding to the identifier information, where the static hardware information is obtained through the out-band channel by the baseboard management controller BMC of the node device to be added; and an adding unit, configured to perform a hot-adding procedure according to the static hardware information for the node device to be added.

A system for node hot-swapping, wherein the system includes a server, a node device to be added; wherein the server includes a storage device, the node device to be added includes a baseboard management controller BMC; wherein:

the server, configured to obtain static hardware information of the node device to be added from the BMC; store the static hardware information into the storage device; receive a node hot-adding command, wherein the hot-adding command carries identifier information of the node device to be added; obtain the static hardware information of the node device to be added corresponding to the identifier information from the storage device; add, according to the static hardware information, the node device to be added;

the BMC, configured to obtain the static hardware information through an out-band channel and send the static hardware information to the server.

With the method and apparatus for node hot-swapping according to the embodiments of the present invention, a BMC is used to obtain the static hardware information of the node device to be added to implement obtaining of the static hardware information, so that the platform management software can obtain the static hardware information without using a BIOS, and that the hot-adding procedure can be performed without cold reset of the node, which simplifies the node hot-adding procedure and improves the operation efficiency of the hot-adding procedure.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
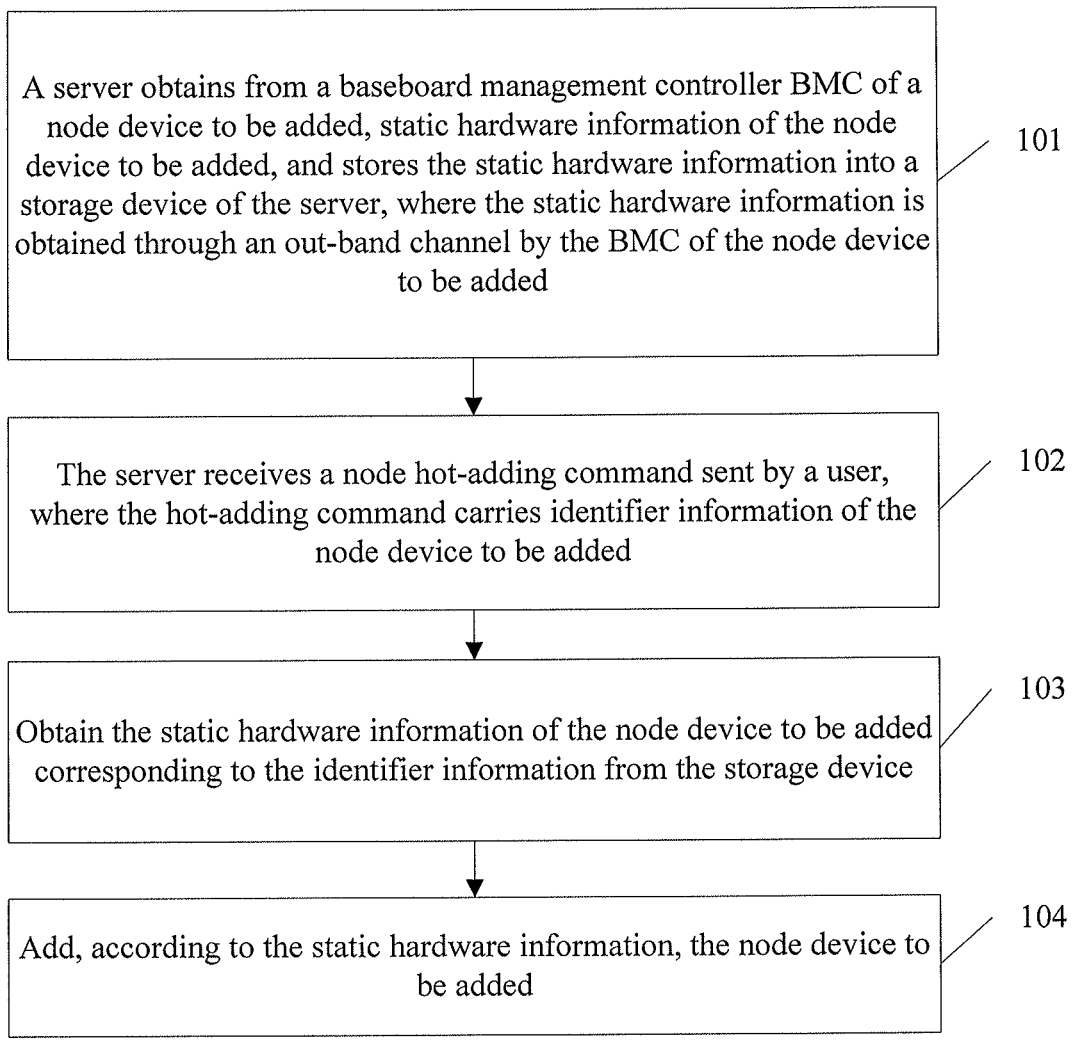
FIG. 1 is a flowchart of a method for node hot-swapping according to Embodiment 1 of the present invention.

An embodiment of the present invention provides a method for node hot-swapping. As shown in FIG. 1, the method includes the following:

101. A server obtains from a baseboard management controller BMC of a node device to be added, static hardware information of the node device to be added, and stores the static hardware information into a storage device of the server, where the static hardware information is obtained through an out-band channel by the BMC of the node device to be added.

The node device to be added may be devices such as a board or a minicomputer, and is not limited by the embodiment of the present invention.

The static hardware information includes the names of the components of the node device to be added and the related attributes of the components, for example, information such as the memory name and memory size, which is not limited by the embodiment of the present invention.

The storage device of the server may be devices such as a hard disk of the server, and is not limited by the embodiment of the present invention.

It should be noted that the method for obtaining the static hardware information through an out-band channel by the baseboard management controller BMC of the node device to be added may be implemented in the following manner, which, assuming that the BMC obtains the static hardware information through a two-wire serial bus, IIC, is specifically:

The BMC is connected to devices such as an SPD (Serial Presence Detect, serial presence detect) on the DIMM (Dual-Inline-Memory-Modules, dual-inline-memory-modules) and a PIROM (Processor Information ROM, processor information ROM) of a CPU through the IIC, where the BMC system serves as a master device and the other devices serves as slave devices. The BMC obtains the static hardware information of the node to be added from the slave devices through the IIC bus. Meanwhile, the BMC may also obtain, through a CPLD (Complex Programmable Logic Device, complex programmable logic device), the static hardware information of the node to be added.

The out-band channel may be an IIC bus, and may also be replaced by a bus with the same transmission function, for example, a PCIE bus, and is not limited by the embodiment of the present invention.

It should be noted that the obtaining the static hardware information of the node device to be added from the BMC of the node device to be added may be implemented respectively by using the following two methods:

First method: querying the BMC of the node device to be added, and obtaining the static hardware information of the node device to be added.

Second method: receiving the static hardware information of the node device to be added that is reported by the BMC of the node device to be added.

Both the two methods may be applied in the node hot-swapping process, and one or both of the two methods may be selected for use according to the actual requirement, which is not limited by the embodiment of the present invention. The specific steps for implementing the above two methods are a well-known technology for persons skilled in the art, and are not further described in detail in the embodiment of the present invention.

102. The server receives a node hot-adding command sent by a user, where the hot-adding command carries identifier information of the node device to be added.

The identifier information of the node device to be added may be information such as the device number of the node device to be added, and is not limited by the embodiment of the present invention.

103. Obtain the static hardware information of the node device to be added corresponding to the identifier information from the storage device.

Further, in order for the user to easily view and query the static hardware information of the node device to be added, after obtaining the static hardware information of the node device to be added corresponding to the identifier information, the method further includes: outputting and displaying the static hardware information. The specific implementation is a well-known technology for persons skilled in the art, and is not further described in detail in the embodiment of the present invention.

104. Add, according to the static hardware information, the node device to be added.

The adding, according to the static hardware information, the node device to be added, may be implemented in the following manner, including:

The server creates, according to the static hardware information, a composition list of node devices to be added, and initiates procedures such as a processor hot-adding procedure, a memory adding procedure, and an IOH Box (Input Output Hub Box, input output hub box) adding procedure one by one for the node devices to be added. The specific implementation steps are a well-known technology for persons skilled in the art, and are not further described in detail in the embodiment of the present invention.

Further, in order for the user to easily view and query, in real time, the hardware information of the node device to be added and ensure correctness of the hardware information of the node to be added which is recorded in the BMC, when adding, according to the static hardware information, the node device to be added, the method further includes: receiving, in real time, the dynamic hardware information sent by the BMC of the node device to be added and outputting and displaying the dynamic hardware information, where the dynamic hardware information is the hardware information sent in real time to the BMC by the BIOS of the node device to be added.

The dynamic hardware information may include the actual operating frequency of the memory or CPU of the node device to be added, and may be set and added according to the actual condition, which is not limited by the embodiment of the present invention.

In addition, it should be noted that step 101 may be executed independently, that is, the following step may be executed independently: The server obtains the static hardware information of the node device to be added from the BMC of the node device to be added and stores the static hardware information to the storage device of the server; the server performs step 102 to step 104 only after the user sends a node hot-adding command; if the user does not send a node hot-adding command, the server does not perform step 102 to step 104.

With the method for node hot-swapping according to the embodiment of the present invention, a BMC is used to obtain the static hardware information of the node device to be added to implement obtaining of the static hardware information, so that the server can obtain the static hardware information without using a BIOS, and that the hot-adding procedure can be performed without cold reset of the node, which simplifies the node hot-adding procedure and improves the operation efficiency of the hot-adding procedure. Meanwhile, the server does not use the BIOS to obtain static hardware information, which simplifies the design of the BIOS software and improves the efficiency of executing the BIOS program.

In addition, in this embodiment, the static hardware information and dynamic hardware information of the node device to be added are output and displayed, so that the user can easily view and query the hardware information of the node device to be added and that correctness of the hardware information of the node to be added which is recorded in the BMC is ensured.

Embodiment 2

Figure 2:
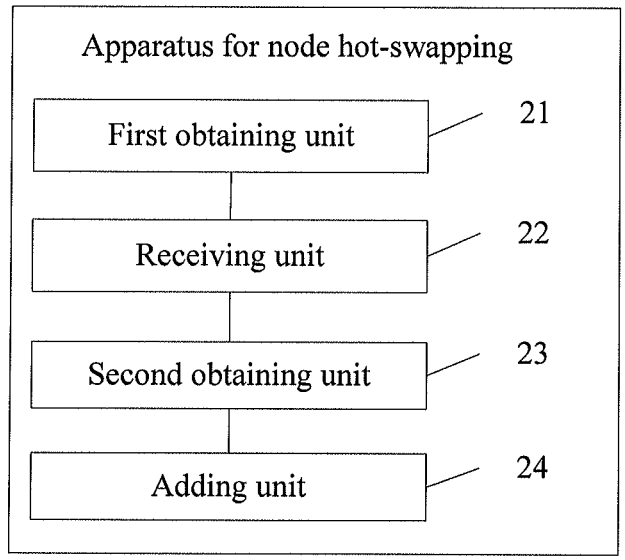
FIG. 2 is a block diagram showing composition of an apparatus for node hot-swapping according to Embodiment 2 of the present invention.

An embodiment of the present invention provides an apparatus for node hot-swapping. As shown in FIG. 2, the apparatus includes: a first obtaining unit 21, a receiving unit 22, a second obtaining unit 23, and a adding unit 24.

The first obtaining unit 21 is configured for a server to obtain from a baseboard management controller BMC of a node device to be added, static hardware information of the node device to be added, and store the static hardware information into a storage device of the server, where the static hardware information is obtained through an out-band channel by the BMC of the node device to be added.

The receiving unit 22 is configured to receive a node hot-adding command sent by a user, where the hot-adding command carries identifier information of the node device to be added.

The second obtaining unit 23 is configured to obtain the static hardware information of the node device to be added corresponding to the identifier information, where the static hardware information is obtained through the out-band channel by the baseboard management controller BMC of the node device to be added.

The adding unit 24 is configured to perform a hot-adding procedure according to the static hardware information for the node device to be added.

Figure 3:
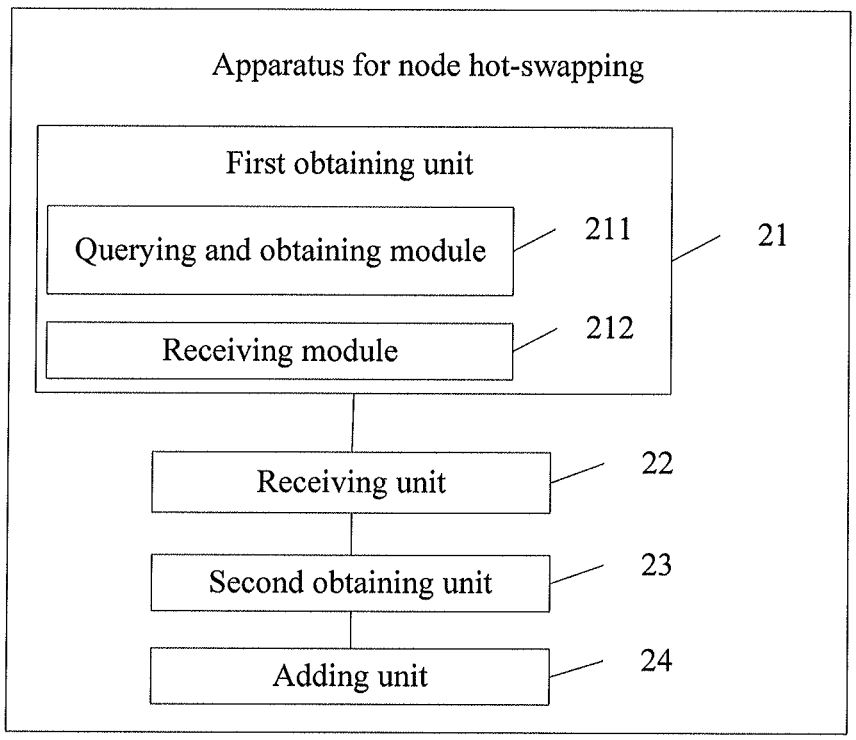
FIG. 3 is a block diagram showing composition of another apparatus for node hot-swapping according to Embodiment 2 of the present invention.

Further, as shown in FIG. 3, the first obtaining unit 21 includes a querying and obtaining module 211 and a receiving module 212.

The querying and obtaining module 211 is configured to query the BMC of the node device to be added corresponding to the identifier information, and obtain the static hardware information of the node device to be added.

The receiving module 212 is configured to receive the static hardware information of the node device to be added that is reported by the BMC of the node device to be added corresponding to the identifier information.

Figure 4:
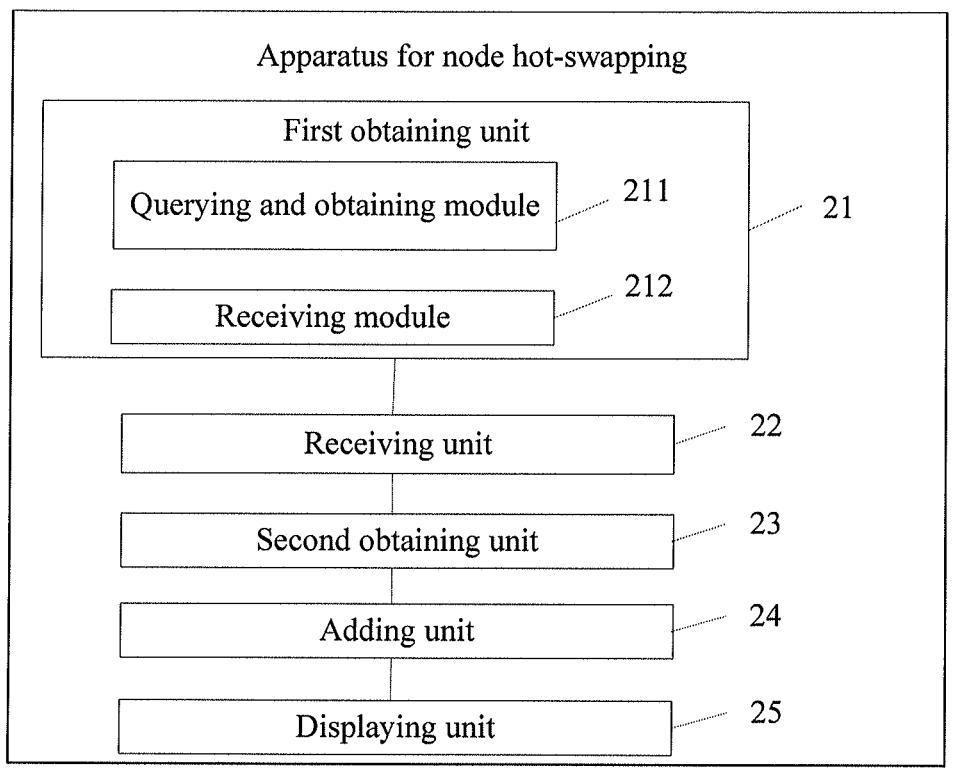
FIG. 4 is a block diagram showing composition of another apparatus for node hot-swapping according to Embodiment 2 of the present invention.

Further, as shown in FIG. 4, the apparatus includes a displaying unit 25.

The displaying unit 25 is configured to output and display the static hardware information.

Figure 5:
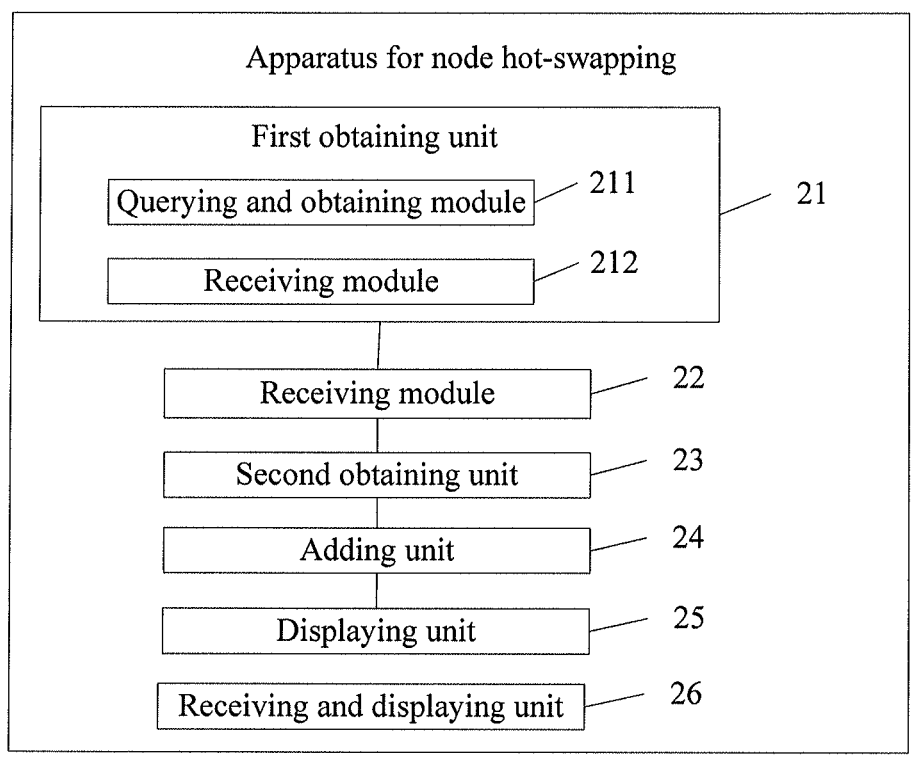
FIG. 5 is a block diagram showing composition of another apparatus for node hot-swapping according to Embodiment 2 of the present invention.

Further, as shown in FIG. 5, the apparatus includes a receiving and displaying unit 26.

The receiving and displaying unit 26 is configured to receive, in real time, the dynamic hardware information sent by the BMC of the node device to be added and output and display the dynamic hardware information, where the dynamic hardware information is the hardware information sent in real time to the BMC by the BIOS of the node device to be added.

With the apparatus for node hot-swapping according to the embodiment of the present invention, a BMC is used to obtain the static hardware information of the node device to be added to implement obtaining of the static hardware information, so that the server can obtain the static hardware information without using a BIOS, and that the hot-adding procedure can be performed without cold reset of the node, which simplifies the node hot-adding procedure and improves the operation efficiency of the hot-adding procedure. Meanwhile, the server does not use the BIOS to obtain static hardware information, which simplifies the design of the BIOS software and improves the efficiency of executing the BIOS program.

In addition, in this embodiment, the static hardware information and dynamic hardware information of the node device to be added are output and displayed, so that the user can easily view and query the hardware information of the node device to be added and that correctness of the hardware information of the node to be added which is recorded in the BMC is ensured.

Through the above description of the embodiments, it is clear to persons skilled in the art that the present invention may be accomplished by software plus necessary universal hardware, and definitely may also be accomplished by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, a network device, and the like) to execute the methods described in the embodiments of the present invention.

The above descriptions are merely specific implementation manners of the present invention, but not intended to limit the protection scope of the present invention. Any variation or replacement that made by persons skilled in the art in the technical scope of the present invention shall fall within the protection scope of the present invention. Therefore, the protection scope of the present invention shall be subject to the protection scope of the claims.

What is claimed is:

1. A method for hot-swapping a node device into a system including a server, wherein the node device comprises a Baseboard Management Controller (BMC), the method comprising:

obtaining by the BMC, static hardware information of the node device through an out-band channel, wherein the static hardware information at least comprises a name of the node device; and sending by the BMC, the static hardware information to the server to add the node device into the system.

2. The method according to claim 1, wherein the node device further comprises a Dual Inline Memory Modules (DIMM) including a Serial Presence Detect (SPD), wherein the BMC is connected to the SPD through two-wire serial bus;

and the obtaining by the BMC the static hardware information of the node device through the out-band channel comprises:

obtaining by the BMC, the static hardware information from the SPD through the two-wire serial bus.

3. The method according to claim 1, wherein the node device further comprises a CPU including a Processor Information ROM (PIROM), wherein the BMC is connected to the PIROM through two-wire serial bus;

and the obtaining by the BMC the static hardware information of the node device through the out-band channel comprises:

obtaining by the BMC, the static hardware information from the PIROM through the two-wire serial bus.

4. The method according to claim 1, wherein the node device comprises a cache; and the static hardware information further comprises a capacity of a memory of the node device.

5. The method according to claim 1, wherein the node device comprises a CPU; and the static hardware information further comprises frequency of the node device.

6. The method according to claim 1, the method further comprising:

receiving by the BMC, a command from the server to request the static hardware information.

7. A node device to be hot-swapped into a system including a server, the node device comprising:

an interface configured to communicated with the server, and a Baseboard Management Controller (BMC) configured to obtain static hardware information of the node device through an out-band channel, wherein the static hardware information at least comprises a name of the node device, and the BMC is configured to send the static hardware information through the interface to the server to add the node device into the system.

8. The node device according to claim 7, wherein the node device further comprises a Dual Inline Memory Modules (DIMM) including a Serial Presence Detect (SPD), wherein the BMC is connected to the SPD through two-wire serial bus;

and the BMC is configured to obtain the static hardware information from the SPD through the two-wire serial bus.

9. The node device according to claim 7, wherein the node device further comprises a CPU including a Processor Information ROM (PIROM), wherein the BMC is connected to the PIROM through two-wire serial bus;

and the BMC is configured to obtain the static hardware information from the PIROM through the two-wire serial bus.

10. The node device according to claim 7, wherein the node device comprises a cache;

and the static hardware information further comprises capacity of a memory of the node device.

11. The node device according to claim 7, wherein the node device comprises a CPU;

and the static hardware information further comprises frequency of the node device.

12. The node device according to claim 7, wherein the BMC is further configured to receive a command from the server to request the static hardware information.

* * * * *